(12) United States Patent
Xie et al.

(10) Patent No.: US 11,644,159 B2
(45) Date of Patent: May 9, 2023

(54) EMERGENCY LIGHT AND INDICATOR CIRCUIT THEREOF

(71) Applicant: XIAMEN ECO LIGHTING CO., LTD., Xiamen (CN)

(72) Inventors: Jianxin Xie, Xiamen (CN); Mingshu Xu, Xiamen (CN); Tian Lan, Xiamen (CN)

(73) Assignee: XIAMEN ECO LIGHTING CO., LTD., Xiamen (CN)

( * ) Notice: Subject to any disclaimer, the term of this patent is extended or adjusted under 35 U.S.C. 154(b) by 373 days.

(21) Appl. No.: 16/878,940

(22) Filed: May 20, 2020

(65) Prior Publication Data

US 2021/0222843 A1 Jul. 22, 2021

(30) Foreign Application Priority Data

Jan. 17, 2020 (CN) .......................... 202020110838.7

(51) Int. Cl.
 *F21L 4/08* (2006.01)
 *H02J 7/00* (2006.01)
 *H01M 10/0525* (2010.01)

(52) U.S. Cl.
 CPC ......... *F21L 4/085* (2013.01); *H01M 10/0525* (2013.01); *H02J 7/00304* (2020.01); *H02J 7/00308* (2020.01); *H02J 2310/22* (2020.01)

(58) Field of Classification Search
 CPC . F21L 4/085; H01M 10/0525; H02J 7/00304; H02J 7/00308; H02J 2310/22; H02J 7/0047; H02J 9/02; Y02E 60/10
 See application file for complete search history.

(56) References Cited

U.S. PATENT DOCUMENTS

2004/0218384 A1\* 11/2004 Newton .................. H02J 50/10
  362/183
2012/0013189 A1\* 1/2012 Jenkins ............... H02J 7/00304
  307/80

(Continued)

FOREIGN PATENT DOCUMENTS

CN 205249551 U \* 5/2016
CN 205249551 U  5/2016

(Continued)

OTHER PUBLICATIONS

Extended European Search Report dated Oct. 5, 2020, in connection with corresponding EP Application No. 20275095.6; 8 pages.

*Primary Examiner* — S M Sohel Imtiaz
(74) *Attorney, Agent, or Firm* — Maier & Maier, PLLC

(57) ABSTRACT

An indicator circuit for an emergency light, including: a charging circuit, in connection with a positive terminal of a lithium battery and configured to charge the lithium battery; a battery protection circuit, in connection with a negative terminal of the lithium battery and configured to provide protection against overvoltage and overcurrent of an electrical signal output by the lithium battery; a main control circuit, in connection with the negative terminal of the lithium battery and configured to compare the electrical signal output by the lithium battery with a reference voltage signal and output a control signal; and a drive circuit, in connection with the main control circuit and an indicator light, and configured to drive the indicator light to illuminate according to the control signal and turn off the indicator light in case of abnormal conditions.

6 Claims, 3 Drawing Sheets

(56) References Cited

U.S. PATENT DOCUMENTS

| | | | | |
|---|---|---|---|---|
| 2014/0240966 | A1* | 8/2014 | Garcia | F21S 9/024 |
| | | | | 362/183 |
| 2018/0269698 | A1* | 9/2018 | Kondo | H01M 50/572 |
| 2019/0081472 | A1* | 3/2019 | Guo | H02J 7/00302 |
| 2019/0319480 | A1* | 10/2019 | Cui | H01M 4/5805 |

FOREIGN PATENT DOCUMENTS

| | | | | |
|---|---|---|---|---|
| CN | 206575193 U | * | 10/2017 | |
| CN | 208063512 U | * | 11/2018 | ......... H05B 33/0815 |
| CN | 208063512 U | | 11/2018 | |
| CN | 208285061 U | * | 12/2018 | |
| CN | 208285061 U | | 12/2018 | |
| EP | 0 191 579 A2 | | 8/1986 | |
| EP | 0191579 A2 | * | 8/1986 | ................ H02J 9/06 |

* cited by examiner

EMERGENCY LIGHT AND INDICATOR CIRCUIT THEREOF

TECHNICAL FIELD

The present application relates to the technical field of electronic circuits, and more particularly to an emergency light and an indicator circuit thereof.

BACKGROUND

Typical batteries for most emergency lights are irreplaceable. It is through a switch that the connection or disconnection of the battery is controlled, which is not convenient for the user to replace the battery according to actual situation.

In the meanwhile, according to the requirement of the safety regulations, an indicator light should be turned on in normal condition and be turned off in abnormal condition. However, many emergency lights cannot satisfy the requirement of the safety regulations, even on the premise of a replaceable battery.

Therefore, the existing emergency light is unable to turn on the indicator light in normal conditions or turn off the indicator light in abnormal conditions, thereby not satisfying the safety requirement.

SUMMARY

In view of this, it is an object of the present application to provide an emergency light and an indicator circuit thereof, which aims at solving the problem that the existing emergency light is unable to turn on the indicator light in normal conditions or turn off the indicator light in abnormal conditions, thereby not satisfying the safety requirement.

A first aspect of embodiments of the present application provides an indicator circuit for an emergency light, which comprises:

a charging circuit, in connection with a positive terminal of a lithium battery and configured to charge the lithium battery;

a battery protection circuit, in connection with a negative terminal of the lithium battery and configured to provide protection against overvoltage and overcurrent of an electrical signal output by the lithium battery;

a main control circuit, in connection with the negative terminal of the lithium battery and configured to compare the electrical signal output by the lithium battery with a reference voltage signal and output a control signal; and a drive circuit, in connection with the main control circuit and an indicator light, and configured to drive the indicator light to illuminate according to the control signal and turn off the indicator light in case of abnormal conditions.

In an embodiment, the main control circuit comprises:

a comparison sub-circuit, in connection with the negative terminal of the lithium battery and configured to compare the electrical signal output by the lithium battery with the reference voltage signal and output a feedback signal; and a control sub-circuit, in connection with the comparison sub-circuit and configured to process the feedback signal and output the control signal.

In an embodiment, the comparison sub-circuit comprises:

a first resistor, a second resistor, and a comparison assembly;

a first terminal of the first resistor is in connection with a power supply, a second terminal of the first resistor and a first terminal of the second resistor are in common connection with a first input terminal of the comparison assembly, the first input terminal of the comparison assembly is input with the reference voltage signal, a second input terminal of the comparison assembly is in connection with the negative terminal of the lithium battery, a second terminal of the second resistor is grounded, and an output terminal of the comparison assembly is in connection with the control sub-circuit.

In an embodiment, the indicator circuit further comprises:

a charging protection circuit, in connection with the charging circuit and the lithium battery and is configured to perform filtration and anti-electromagnetic interference on the electrical signal output by the charging circuit.

In an embodiment, the control sub-circuit adopts a microcontroller unit.

In an embodiment, the charging circuit comprises an AC/DC power supply with a preset voltage value.

In an embodiment, the control signal is regulated according to a state of the lithium battery and variation of the reference voltage signal.

In an embodiment, the state of the lithium battery comprises: a charge state, a discharge state, a fully charged state, and an unplugged state of the lithium battery.

A second aspect of the present application provides an emergency light, which comprises: a lithium battery, an indicator light, and the indicator circuit as described in the above.

In an embodiment, the lithium battery is replaceable.

The emergency light and the indicator circuit thereof according to embodiments of the present application, comprise: the charging circuit, the battery protection circuit, the main control circuit, and the drive circuit. The lithium battery is charged by the charging circuit, and the electrical signal output by the lithium battery is performed with overvoltage protection and overcurrent protection by the battery protection circuit, then the electrical signal output by the lithium battery is compared by the main control circuit with the reference voltage signal to output a control signal, such that the driver circuit drives, according to the control signal, the indicator light to illuminate in normal conditions and to be turned off in abnormal conditions. In this way, the emergency light is capable of illuminating in normal operation of the system and being turned off in abnormal operation of the system. In addition, the lithium battery is replaceable, the indicator circuit can recognize the condition when the lithium battery is unplugged, so as to control the indicator light, which satisfies the safety requirement, improves the user experience, and solves the problem that the existing emergency light is unable to turn on the indicator light in normal conditions or turn off the indicator light in abnormal conditions, thereby not satisfying the safety requirement.

BRIEF DESCRIPTION OF THE DRAWINGS

In order to more clearly explain the technical solutions in embodiments of the present application, the drawings required in the embodiments or the description of the prior art will be briefly introduced. Obviously, the drawings in the following description are only some embodiments of the present application. Those skilled in the art would obtain other drawings based on these drawings without creative work.

DETAILED DESCRIPTION OF THE EMBODIMENTS

In order to make the purpose, technical solutions, and advantages of the present application clearer, the present application is described in further detail with reference to the accompanying drawings and embodiments. It should be understood that the specific embodiments described herein are only used to explain the present application, but not intended to limit the present application.

Figure 1:
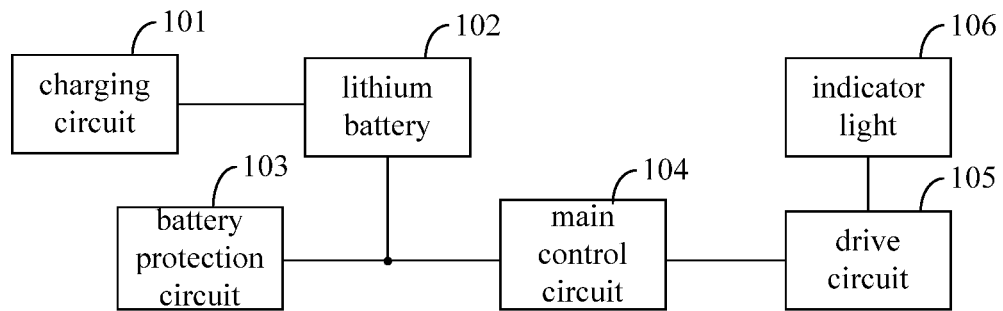
FIG. 1 is a structural diagram of an indicator circuit for an emergency light according to an embodiment of the present application.

FIG. 1 illustrates a structure of an indicator circuit of an emergency light provided by an embodiment of the present application. For convenience of description, only relevant parts of this embodiment are shown.

The indicator circuit for an emergency light, comprises: a charging circuit 101, a battery protection circuit 103, a main control circuit 104, and a drive circuit 105.

The charging circuit 101 is in connection with a positive terminal of a lithium battery 102 and configured to charge the lithium battery 102.

In particular, the charging circuit 101 is configured to charge the lithium battery 102, the lithium battery 102 is configured to store the electricity after receiving an electrical signal. The lithium battery 102 can be generally divided into the following two types: lithium metal batteries and lithium ion batteries. In addition, the charging circuit 101 comprises an AC/DC power supply with a preset voltage value.

The battery protection circuit 103 is in connection with a negative terminal of the lithium battery 102 and configured to provide protection against overvoltage and overcurrent of an electrical signal output by the lithium battery 102.

In particular, the battery protection circuit 103 performs overvoltage protection and overcurrent protection on the electrical signal output by the lithium battery 102, that is, when the electrical signal output by the lithium battery exceeds a preset voltage value or a preset current value, the whole circuit is cut off, such that the electronic components in the indicator circuit are protected from being damaged.

The main control circuit 104 is in connection with the negative terminal of the lithium battery 102 and is configured to compare the electrical signal output by the lithium battery 102 with a reference voltage signal and output a control signal.

In particular, it is determined whether an indicator light 106 is in a normal state or an abnormal state by combining with the reference voltage signal.

The drive circuit 105 is in connection with the main control circuit 104 and an indicator light 106. The indicator light 106 is driven to illuminate according to the control signal, and is turned off in case of abnormal conditions.

In particular, due to the arrangement of the drive circuit 105, the indicator light 106 is enabled to illuminate in normal conditions and be turned off in abnormal conditions, which satisfies the requirements of the safety regulations. In addition, users are capable of timely judging whether or not the emergency light operates normally according to the illumination state of the indicator light 106.

It would be understood that the control signal is regulated according to a state of the lithium battery 102 and variation of a value of the reference voltage signal. The state of the lithium battery 102 comprises: a charge state, a discharge state, a fully charged state, and an unplugged state.

Figure 2:
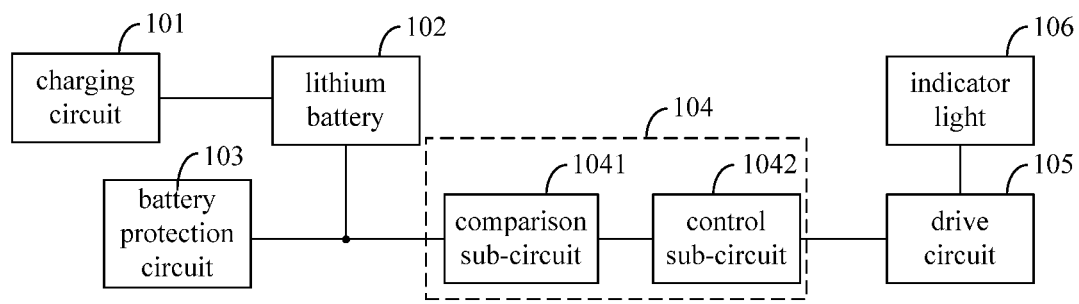
FIG. 2 is a specific structural diagram of the indicator circuit for an emergency light corresponding to FIG. 1.

As shown in FIG. 2, in the above indicator circuit for an emergency light, the main control circuit 104 comprises: a comparison sub-circuit 1041 and a control sub-circuit 1042.

The comparison sub-circuit 1041 is in connection with the negative terminal of the lithium battery 102 and is configured to compare the electrical signal output by the lithium battery 102 with the reference voltage signal and output a feedback signal.

The control sub-circuit 1042 is in connection with the comparison sub-circuit 1041, and is configured to process the feedback signal and output the control signal.

Exemplarily, the control sub-circuit 1042 adopts a microcontroller unit.

Figure 3:
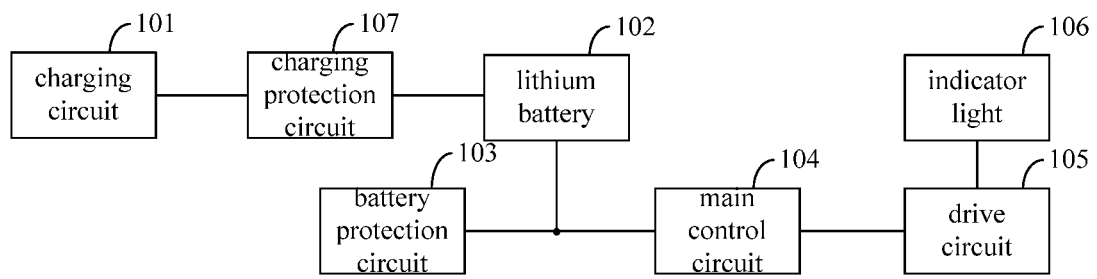
FIG. 3 is a structural diagram of an indicator circuit for an emergency light according to another embodiment of the present application.
Figure 4:
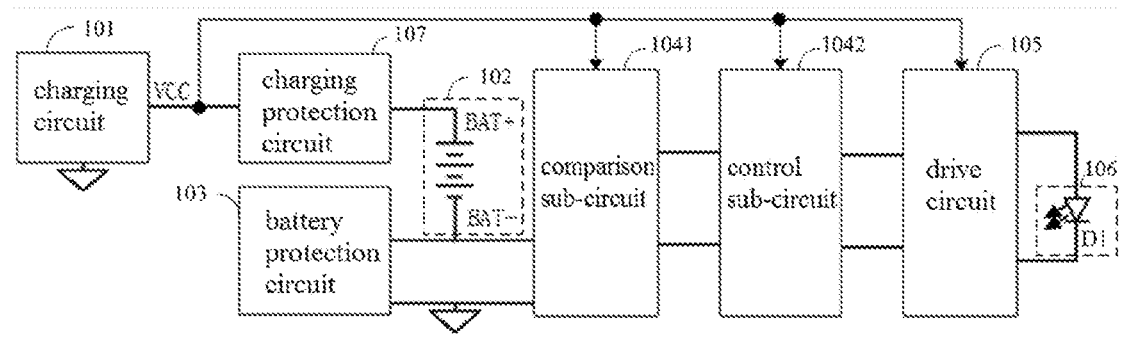
FIG. 4 is a schematic diagram of the indicator circuit for an emergency light corresponding to FIG. 3.

FIGS. 3-4 illustrate the structure and the principle of an indicator circuit for an emergency light according to another embodiment of the present application. For ease of the description, only the parts related to the present embodiment are illustrated, which are described in detail as follows:

As an embodiment of the present application, on the basis of FIG. 1, the indicator circuit further comprises a charging protection circuit 107, which is in connection with the charging circuit 101 and the lithium battery 102 and is configured to perform filtration and anti-electromagnetic interference on the electrical signal output by the charging circuit 101.

In particular, the charging protection circuit 107 filtrates electrical signal output by the charging circuit 10 to remove specific frequency bands and performs anti-electromagnetic interference on the electrical signal output by the charging circuit 10, thereby functioning in inhibition and anti-interference.

Figure 5:
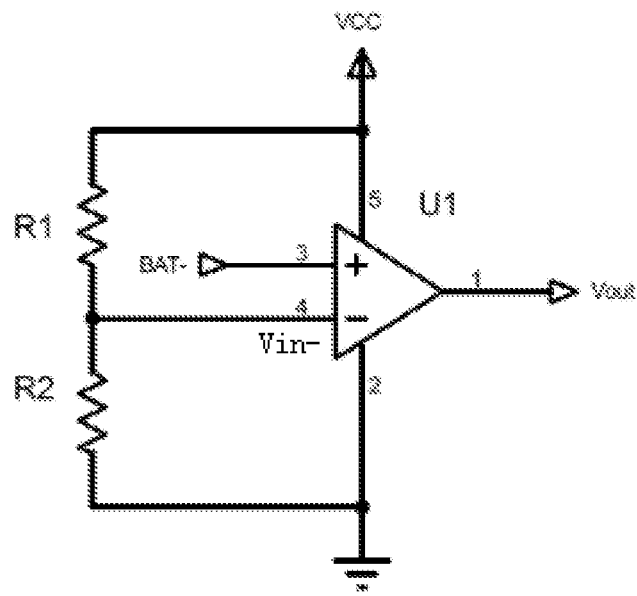
FIG. 5 is an exemplary circuit diagram of a comparison sub-circuit in the indicator circuit for an emergency light corresponding to FIG. 3.

An exemplary circuit diagram of a comparison sub-circuit in the indicator circuit for an emergency light provided by the present application is shown in FIG. 5. For the convenience of explanation, only the parts related to the present embodiment is shown, which is explained in detail as follows:

As an optional embodiment, the comparison sub-circuit 1041 comprises: a first resistor R1, a second resistor R2, and a comparison assembly (which adopts an operational amplifier U1 in FIG. 5).

A first terminal of the first resistor R1 is in connection with a power supply VCC, a second terminal of the first resistor R1 and a first terminal of the second resistor R2 are in connection with a first input terminal of the comparison assembly, the first input terminal of the comparison assembly is input with the reference voltage signal, a second input terminal of the comparison assembly is in connection with the negative terminal of the lithium battery BAT–, a second terminal of the second resistor R2 is grounded, and an output terminal of the comparison assembly is in connection with the control sub-circuit 1042.

Exemplarily, the comparison assembly comprises an operational amplifier or a comparator.

An inverting input terminal, a non-inverting input terminal, and an output terminal of the operational amplifier respectively correspond to the first input terminal, the second input terminal, and the output terminal of the comparison assembly.

An inverting input terminal, a non-inverting input terminal, and an output terminal of the comparator respectively correspond to the first input terminal, the second input terminal, and the output terminal of the comparison assembly.

The present application further provides an emergency light, which comprises a lithium battery 102, and an indicator light 106; and further comprises:

the indicator circuit as described in the above.

The above lithium battery 102 can be replaceably used, that is, the emergency light can use either the lithium battery with a protection circuit or the lithium battery without a protection circuit. It should be noted that the emergency light adds the lithium battery 102 and the indicator 106 on the basis of the above indicator circuit, so the functional description and the principle of the charging circuit 101, the battery protection circuit 103, the main control circuit 104, the drive circuit 105, and the charging protection circuit 107 may refer to embodiments in FIGS. 1-5, which would not be repeated herein.

Figure 6:
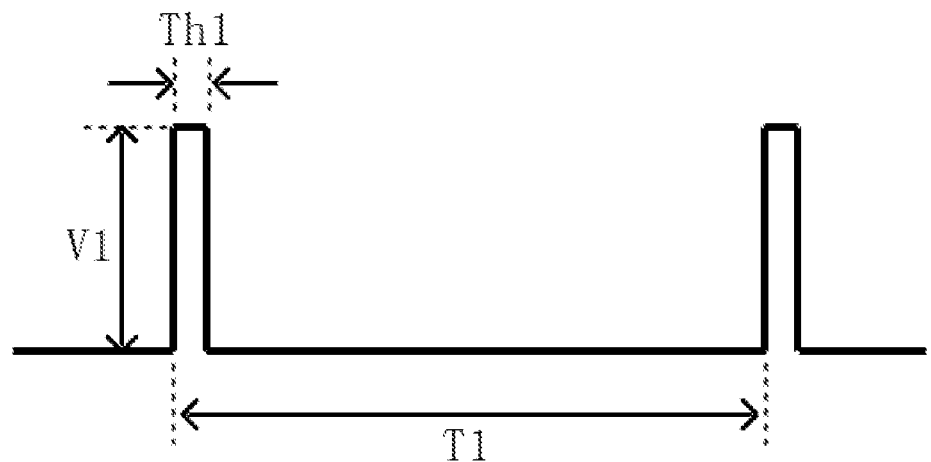
FIG. 6 is a waveform diagram at BAT– after a lithium battery is unplugged from an indicator circuit for an emergency light according to the present application.
Figure 7:
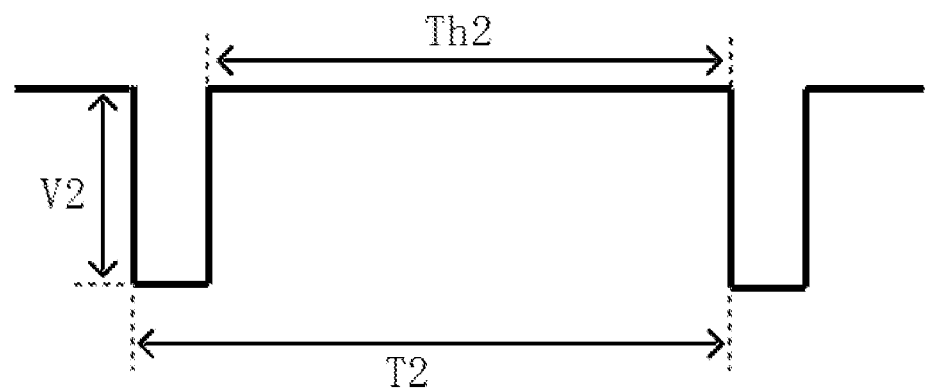
FIG. 7 is a waveform diagram at BAT– after a lithium battery in an indicator circuit for an emergency light according to the present application is fully charged.

FIGS. 6 and 7 respectively show the waveform of BAT− in condition when the lithium battery is unplugged and in condition when the lithium battery is fully charged, working principles of the emergency light and the indicator circuit thereof are described hereinbelow with reference to FIGS. 1-7.

In FIG. 6, a maximum value of V1 is about 3V. It should be noted that the high level part of the waveform (hereinafter referred to as waveform 1) is not necessarily a complete DC high level, and may contain glitches. A typical duration for T1 is 1 s. In practice, V1 and T1 are actually measured values.

In FIG. 7, a maximum value of V2 of the waveform (hereinafter referred to as waveform 2) is set to about 2V. A typical duration of T2 can reach 10 s. In practice, V2 and T2 are actually measured values.

When the lithium battery 102 is discharging, a voltage at a BAT− pin always keeps 0V, and no pulse waveform is output.

When the lithium battery 102 is being charged, a voltage at the BAT− pin always keeps 0V, and no pulse waveform is output.

Since the control signal is adjusted according to the state of the lithium battery 102 and the variation of the value of the reference voltage signal, the following two schemes are explained:

$$V2 < V_{in-} < V1;\quad\quad\text{Scheme 1}$$

A voltage after being divided by the first resistor R1 and the second resistor R2, that is, a voltage $V_{in-}$ input to the inverting input terminal of the operational amplifier, is between V1 in waveform 1 and V2 in waveform 2. For example, when V1=3V and V2=2V, the voltage $V_{in-}$ at the inverting input terminal can be set at 2.5V. In such condition, only the high level of waveform 1 will make the operational amplifier output a high level, therefore, the control sub-circuit 1042 only needs to detect the existence of waveform 1. When the control sub-circuit 1042 detects waveform 1, the indicator 106 needs to be turned off, or otherwise, the indicator is required to be turned on. During the discharging process of the lithium battery 102, that is, when the VCC has no voltage, the control sub-circuit 1042 itself does not work, then the indicator light 106 is turned off, which complies with the safety regulations.

In summary, the status of the indicator light 106 under different conditions of the lithium battery 102 is as follows:

| | VCC | Voltage/waveform at BAT- of the lithium battery | Vout of the operational amplifier (given V2 < $V_{in-}$ < V1) | MCU | Status of indicator light | Whether or not satisfy the safety requirement |
|---|---|---|---|---|---|---|
| Discharge state | Without voltage | 0 V, no waveform | 0 V, no waveform | Not work | Off | Yes, with indicator light off in abnormal conditions |
| Charge state | With voltage | 0 V, no waveform | 0 V, no waveform | No waveform detected | On | Yes, with indicator light on in normal conditions |
| Fully charged state | With voltage | Pulse waveform 2, the high level V2 is about 2 V | 0 V, no waveform | No waveform detected | On | Yes, with indicator light on in normal conditions |
| Unplugged state | With voltage | Pulse waveform 1, the high level V1 is about 3 V | Pulse waveform 1' | Determination of existence of pulse waveform 1' | Off | Yes, with indicator light off in abnormal conditions |

Note:
due to the processing by the operational amplifier, high levels of the pulse waveform 1' and the pulse waveform 1 may be different or even inverting, but this would not affect the MCU to make determination of the existence of the pulse waveform 1.

The scheme for detecting the pulse waveform 1 may be as follows: the period T1 of the pulse and the duration Th1 of the high level (or the duration of the low level) are measured, then if it is determined that the period T1 and the duration Th1 of the high level are within error ranges, it is indicated that the pulse waveform 1 is detected.

$$V_{in-} < V1, \text{ and } V_{in-} < V2;\quad\quad\text{Scheme 2}$$

The voltage after divided by the first resistor R1 and the second resistor R2, that is, the voltage Vin− input to the inverting input terminal of the operational amplifier U1, is smaller than V1 in waveform 1 and V2 in waveform 2. For example, when V1=3V and V2=2V, the voltage Vin− at the inverting input terminal can be set to be 1.5V. In such case, high levels of waveform 1 and waveform 2 will cause the operational amplifier U1 to output a high level.

Because two waveforms are output by the operational amplifier U1 when adopting such scheme, the two waveforms need to be distinguished by the control sub-circuit 1042. Similarly, the indicator light 106 is turned off only when the pulse waveform 1 is detected by the control sub-circuit 1042, otherwise the indicator 106 illuminates.

In summary, the status of the indicator light 106 under different conditions of the lithium battery 102 is as follows:

|  | VCC | Voltage/waveform at BAT− of the lithium battery | Vout of the operational amplifier (given Vin−< V1, and Vin−< V2) | MCU | Status of indicator light | Whether or not satisfy the safety requirement |
|---|---|---|---|---|---|---|
| Discharge state | Without voltage | 0 V, no waveform | 0 V, no waveform | Not work | Off | Yes, with indicator light off in abnormal conditions |
| Charge state | With voltage | 0 V, no waveform | 0 V, no waveform | cfv | On | Yes, with indicator light on in normal conditions |
| Fully charged state | With voltage | Pulse waveform 2, the high level V2 is about 2 V | Pulse waveform 2' | Determination of existence of pulse waveform 2' | On | Yes, with indicator light on in normal conditions |
| Unplugged state | With voltage | Pulse waveform 1, the high level V1 is about 3 V | Pulse waveform 1' | Determination of existence of pulse waveform 1' | Off | Yes, with indicator light off in abnormal conditions |

Note:
due to the processing by the operational amplifier, high levels of the pulse waveform 1'/2' and the pulse waveform 1/2 may be different or even inverting, but this would not affect the MCU to make determination of the existence of the pulse waveform 1/2.

Therefore, the designed comparison sub-circuit 1041 can screen waveform 1 (in case that the lithium battery 102 is unplugged), and the designed control sub-circuit 1042 can detect the presence of waveform 1 and control the indicator light 106 to be turned off in such condition.

Or alternatively, the designed comparison sub-circuit 1041 can screen waveform 1 and waveform 2, and the designed control sub-circuit 1042 can detect the presence of waveform 1 and control the indicator light 106 to be turned off in such condition.

The emergency light and the indicator circuit thereof according to embodiments of the present application, comprise: the charging circuit, the battery protection circuit, the main control circuit, and the drive circuit. The lithium battery is charged by the charging circuit, and the electrical signal output by the lithium battery is performed with overvoltage protection and overcurrent protection by the battery protection circuit, then the electrical signal output by the lithium battery is compared by the main control circuit with the reference voltage signal to output a control signal, such that the driver circuit drives, according to the control signal, the indicator light to illuminate in normal conditions and to be turned off in abnormal conditions. In this way, the emergency light is capable of illuminating in normal operation of the system and being turned off in abnormal operation of the system. In addition, the lithium battery is replaceable, the indicator circuit can recognize the condition when the lithium battery is unplugged, so as to control the indicator light, which satisfies the safety requirement, improves the user experience, and solves the problem that the existing emergency light is unable to turn on the indicator light in normal conditions or turn off the indicator light in abnormal conditions, thereby not satisfying the safety requirement.

Various embodiments are described herein for various devices, circuits, devices, systems, and/or methods. Many specific details are set forth to provide a thorough understanding of the general structure, function, manufacture, and use of the embodiments as described in the specification and shown in the drawings. However, those skilled in the art will understand that the embodiments may be implemented without such specific details. In other instances, well-known operations, components, and elements have been described in detail so as not to obscure the embodiments in the specification. Those skilled in the art will understand that the embodiments shown and described herein are non-limiting examples, and therefore it can be appreciated that the specific structural and functional details disclosed herein may be representative and do not necessarily limit the scope of the embodiments.

Reference to "various embodiments", "in an embodiment", "one embodiment" or "an embodiment" throughout the specification means that a particular feature, structure, or characteristic described in relation to an embodiment is included in at least one embodiment. Therefore, the appearance of the phrases "in various embodiments", "in some embodiments", "in one embodiment", or "in an embodiment" in appropriate places throughout the specification does not necessarily refer to the same implementation. Furthermore, specific features, structures, or characteristics may be combined in any suitable manner in one or more embodiments. Therefore, specific features, structures, or characteristics shown or described in relation to one embodiment may be wholly or partially combined with features, structures, or characteristics of one or more other embodiments without making assumptions that such a combination is not illogical or no functional restrictions. Any direction reference (e.g., plus, minus, upper, lower, up, down, left, right, left, right, top, bottom, above, below, vertical, horizontal, straight (clockwise and counterclockwise) are used for identification purposes to help the reader understand the present application and do not create limitations, especially regarding the location, orientation, or use of the embodiments.

Although certain embodiments are described in the above in details, those skilled in the art can make many changes to the disclosed embodiments without departing from the scope of the present application. Connection references (e.g., attachment, coupling, connection, etc.) should be widely interpreted and may include intermediate members between connections of elements and relative movement between elements. Therefore, a connection reference does not necessarily imply that two elements are directly connected/coupled or in a fixed relationship with each other. The use of "for example" throughout the specification should be widely interpreted and used to provide non-limiting examples of embodiments of the present application, and the present disclosure is not limited to such examples. It is intended that all matters included in the above description or shown in the drawings should be interpreted as illustrative only and not limiting. Changes may be made without departing from the present application.

The above are only the preferred embodiments of the present application and are not intended to limit the present application. Any modification, equivalent replacement, and improvement made within the spirit and principles of the present application should be included within the protection scope of the present application.

What is claimed is:

1. An indicator circuit for an emergency light, comprising:
    a charging circuit, in connection with a positive terminal of a lithium battery and configured to charge the lithium battery;
    a battery protection circuit, in connection with a negative terminal of the lithium battery and configured to provide protection against overvoltage and overcurrent of an electrical signal output by the lithium battery;
    a main control circuit, in connection with the negative terminal of the lithium battery and configured to compare the electrical signal output by the lithium battery with a reference voltage signal and output a control signal; and
    a drive circuit, in connection with the main control circuit and an indicator light, and configured to drive the indicator light to illuminate according to the control signal and turn off the indicator light in case of abnormal conditions;
wherein
    the main control circuit comprises:
        a comparison sub-circuit, in connection with the negative terminal of the lithium battery and configured to compare the electrical signal output by the lithium battery with the reference voltage signal and output a feedback signal; and
        a control sub-circuit, in connection with the comparison sub-circuit and configured to process the feedback signal and output the control signal; and
    the comparison sub-circuit comprises:
        a first resistor, a second resistor, and a comparison assembly; and
        a first terminal of the first resistor is in connection with a power supply, a second terminal of the first resistor and a first terminal of the second resistor are in common connection with a first input terminal of the comparison assembly, the first input terminal of the comparison assembly is input with the reference voltage signal, a second input terminal of the comparison assembly is in connection with the negative terminal of the lithium battery, a second terminal of the second resistor is grounded, and an output terminal of the comparison assembly is in connection with the control sub-circuit.

2. The indicator circuit according to claim 1, further comprising:
    a charging protection circuit, in connection with the charging circuit and the lithium battery and is configured to perform filtration and anti-electromagnetic interference on the electrical signal output by the charging circuit.

3. The indicator circuit according to claim 1, wherein the control sub-circuit adopts a microcontroller unit.

4. The indicator circuit according to claim 1, wherein the charging circuit comprises an AC/DC power supply with a preset voltage value.

5. The indicator circuit according to claim 1, wherein the control signal is regulated according to a state of the lithium battery and variation of a value of the reference voltage signal.

6. The indicator circuit according to claim 5, wherein the state of the lithium battery comprises: a charge state, a discharge state, a fully charged state, and an unplugged state of the lithium battery.

* * * * *